United States Patent [19]

Christe et al.

[11] 4,107,275
[45] Aug. 15, 1978

[54] METHOD FOR PRODUCING NF$_4$BF$_4$

[75] Inventors: Karl O. Christe, Calabasas; Carl J. Shack, Chatsworth; Richard D. Wilson, Canoga Park, all of Calif.

[73] Assignee: Rockwell International Corporation, El Segundo, Calif.

[21] Appl. No.: 731,198

[22] Filed: Oct. 12, 1976

[51] Int. Cl.$^2$ .............................................. C01B 35/14
[52] U.S. Cl. .................................. 423/276; 149/119; 423/351
[58] Field of Search .................... 149/19.3, 109.4, 119; 423/276, 351, 472

[56] References Cited

U.S. PATENT DOCUMENTS

| | | | |
|---|---|---|---|
| 3,708,570 | 1/1973 | Tolberg et al. | 149/119 X |
| 3,980,509 | 9/1976 | Lubowitz et al. | 149/119 |
| 3,981,756 | 9/1976 | Gotzmer | 149/19.92 X |

OTHER PUBLICATIONS

Christe et al., "Inorganic Halogen Oxidizer Research," Report R-9662, pp. B1-B4 (May 2, 1975).
Goetschel et al., *Inorganic Chemistry*, 11, No. 7, pp. 1696-1701 (1972).

*Primary Examiner*—Edward A. Miller
*Attorney, Agent, or Firm*—L. Lee Humphries; Robert M. Sperry

[57] ABSTRACT

SbF$_5$ is heated in the presence of an excess of NF$_3$ and F$_2$ to 250° C until conversion of the SbF$_5$ to NF$_4$SbF$_6$ is complete. The NF$_4$SbF$_6$ may be used itself or may be combined, in 0-15 mol % excess, with CsBF$_4$ in anhydrous HF to produce NF$_4$BF$_4$.

5 Claims, No Drawings

METHOD FOR PRODUCING NF$_4$BF$_4$

BACKGROUND OF THE INVENTION

1. Field of the Invention

This invention relates to methods of producing NF$_4$BF$_4$ and its precursor NF$_4$SbF$_6$.

2. Description of the Prior Art

Solid propellant gas generators, such as that described by D. Pilipovich in U.S. Pat. No. 3,963,542, are of great importance for chemical HF-DF lasers. These gas generators are based on NF$_4$$^+$ salts. Due to its high NF$_3$ and F$_2$ content, NF$_4$BF$_4$ is one of the materials most preferred in making these gas generators. However, there has not previously been an economically feasible method for producing NF$_4$BF$_4$ in a state of sufficient purity to permit its practical application.

Several methods have previously been reported for the synthesis of NF$_4$BF$_4$. This salt has been prepared either directly from NF$_3$, F$_2$, and BF$_3$ using glow discharge, bremsstrahlung or ultraviolet radiation, or indirectly from NF$_4$SbF$_6$ using a metathetical process. Of these, only the metathetical process is amenable to the larger scale production of NF$_4$BF$_4$ utilizing existing technology. The original metathetical NF$_4$BF$_4$ process involved the following steps:

$$\text{CsF} + \text{HF} \xrightarrow{HF} \text{CsHF}_2$$

$$\text{NF}_4\text{SbF}_6 + \text{CsHF}_2 \xrightarrow{HF} \text{CsSbF}_6 \downarrow + \text{NF}_4\text{HF}_2$$

$$\text{NF}_4\text{HF}_2 + \text{BF}_3 \xrightarrow{HF} \text{NF}_4\text{BF}_4 + \text{HF}$$

Since the crude product, thus obtained, contained much CsSbF$_6$, its NF$_4$BF$_4$ content had to be increased by extraction with BrF$_5$. The use of BrF$_5$ resulted in the following side reaction:

$$\text{NF}_4\text{BF}_4 + \text{CsSbF}_6 \xrightarrow{BrF_5} \text{CsBF}_4 \downarrow + \text{NF}_4\text{SbF}_6$$

The composition of the final product was reported to be: 91.5% NF$_4$BF$_4$ and 8.5% NF$_4$SbF$_6$. In addition to the low purity of the product and the requirement of BrF$_5$ as a recrystallization solvent, this process suffers from the following disadvantage. Highly concentrated solutions of NF$_4$HF$_2$ in HF are unstable decomposing to NF$_3$, F$_2$, and HF. This can cause a pressure build up in the metathesis apparatus which in turn can render filtration steps more difficult.

This process was somewhat improved upon by substituting CsF by AgF. This modification eliminated the BrF$_5$ extraction step and resulted in a product of the composition (mol %): NF$_4$BF$_4$ (89), NF$_4$Sb$_2$F$_{11}$ (7.9), AgBF$_4$ (3.1). However, the process still involved the handling of concentrated NF$_4$HF$_2$ solutions and consisted of a rather large number of steps. Furthermore, the cost of silver salts is rather high and, therefore, requires their recycling. This process can be described by the following steps:

$$\text{AgF} + \text{HF} \xrightarrow{in\ HF} \text{AgHF}_2 \text{ (filtration required to remove impurities)}$$

$$2\ \text{AgHF}_2 + \text{NF}_4\text{SbF}_6 \cdot \text{SbF}_5 \xrightarrow{in\ HF} 2\ \text{AgSbF}_6 \downarrow + \text{NF}_4\text{HF}_2$$

$$\text{NF}_4\text{HF}_2 + \text{BF}_3 \xrightarrow{in\ HF} \text{NF}_4\text{BF}_4 + \text{HF}$$

$$\text{AgHF}_2 + \text{BF}_3 \xrightarrow{in\ HF} \text{AgBF}_4 \downarrow + \text{HF}$$

$$\text{AgSbF}_6 \xrightarrow{\Delta T} \text{AgF} + \text{SbF}_5$$

Since these metathetical processes use NF$_4$SbF$_6$ as a precursor, a simple production method for this compound is also desirable. Two methods have previously been reported for the synthesis of NF$_4$SbF$_6 \cdot x$SbF$_5$ involving the use of either high pressure and temperature or uv-irradiation. Of these, the thermal method is more convenient for larger scale production. According to Tolberg et al. the most favorable reaction conditions are:

$$\text{NF}_3 + \text{F}_2 + \text{SbF}_5 \xrightarrow[\substack{100-125° \\ 2\ \text{days}}]{3000\ \text{psi}} \text{NF}_4\text{Sb}_3\text{F}_{16}$$

$$\text{NF}_4\text{Sb}_3\text{F}_{16} \xrightarrow[\substack{200° \\ 2-3\ \text{days}}]{\text{vacuum}} \text{NF}_4\text{SbF}_6 + 2\text{SbF}_5$$

The resulting product contained an appreciable amount of Monel salts and was removed from the reactor by cutting it open with a hacksaw and scraping out the hard clinkered product. Based on recent work done in our laboratory, temperatures (250°–260°), higher than those reported by Tolberg, are required for the vacuum pyrolysis of NF$_4$SbF$_6 \cdot x$SbF$_5$ to NF$_4$SbF$_6$ within a reasonable time period.

BRIEF SUMMARY AND OBJECTS OF INVENTION

These disadvantages of the prior art are overcome with the present invention. We have found that NF$_4$BF$_4$ of at least 97 mol % purity can be prepared by a simpler process using anhydrous HF at different temperatures as the only solvent. Furthermore, we have shown that the purity of the NF$_4$BF$_4$ can be raised to above 99 mol % by a single recrystallization from BrF$_5$. The cesium content in both products was shown to be less than 0.1 mol %, the principal impurity being NF$_4$SbF$_6$.

Our improved process consists of the following steps:

$$\text{CsBF}_4 + 1.1\ \text{NF}_4\text{SbF}_6 \xrightarrow[-78°\ \text{filtr.}]{\text{HF}} \text{CsSbF}_6 \downarrow + \text{NF}_4\text{BF}_4 \cdot 0.1\ \text{NF}_4\text{SbF}_6$$

$$\text{NF}_4\text{BF}_4 + 0.1\ \text{NF}_4\text{SbF}_6 \xrightarrow[25°]{\text{recryst. from HF}} \text{NF}_4\text{BF}_4 \downarrow + \text{mother liquor}\ (97\ m\ \%)$$

$$\text{NF}_4\text{BF}_4\ (97m\ \%) \xrightarrow[25°]{\text{recryst. from BrF}_5} \text{NF}_4\text{BF}_4 \downarrow + \text{mother liquor}\ (99+\ m\ \%)$$

The important features of our process are:

1. The use of CsBF$_4$ instead of CsHF$_2$ eliminates one step and avoids the complications caused by NF$_4$HF$_2$.
2. The use of a 10 mol % excess of NF$_4$SbF$_6$ decreases the solubility of CsSbF$_6$ by the common ion effect.
3. Carrying out the CsSbF$_6$ filtration step at −78° decreases the SbF$_6$$^-$ concentration since the solubilities of SbF$_6$$^-$ salts in anhydrous HF decrease with decreasing temperature much more rapidly than those of BF$_4$$^-$ salts. Furthermore, the amount of NF$_4$BF$_4$, retained in the CsSbF$_6$ filter cake by absorption of a certain volume of mother liquor, is minimized owing to the decreased solubilities.

4. Since $NF_4BF_4$ and $NF_4SbF_6$ have comparable solubilities in HF at room temperature, the 10% excess of $NF_4SbF_6$ used in the $CsSbF_6$ precipitation step can be removed as mother liquor by recrystallization from HF at room temperature. Unfortunately, the solubilities in HF at room temperature are so high that a significant percentage of the mother liquor is retained by the $NF_4BF_4$ precipitate. This problem can be minimized by using for this recrystallization a solvent in which these $NF_4^+$ salts are less soluble. Thus, a single recrystallization from $BrF_5$ raised the product purity above the 99 mol % level. Other suitable solvents could be used to replace $BrF_5$ in this step. The mother liquors of the recrystallization steps can be easily recycled into the $CsSbF_6$ precipitation step, thus avoiding the loss of any $NF_4^+$ values.

The sythesis of the $NF_4SbF_6$ precursor was also simplified. It was found that most of the drawbacks of the prior art can be avoided by drectly synthesizing $NF_4SbF_6$. For this purpose, $NF_3$, $F_2$, and $SbF_5$ in a 2:2:1 mol ratio are heated in a Monel cylinder to 250° for 72 hours. The size of the cylinder is chosen in such manner that at the completion of the reaction the autogenous pressure is about 70 atm. The excess of $NF_3$ and $F_2$ is removed under vacuum at room temperature and the desired $NF_4SbF_6$ product is extracted from the Monel cylinder with anhydrous HF using about 50 ml of liquid HF per 100 g of $NF_4SbF_6$. Since, contrary to a previous report, the formed Monel salt impurities (about 5%) are quite insoluble in anhydrous HF, they can be easily removed from the product by incorporating a porous Teflon filter into the HF solution transfer line. Based on elemental and spectroscopic analyses and the observed material balances, the resulting product was shown to be essentially pure $NF_4SbF_6$.

In summary, the combination of the two improved processes for the syntheses of $NF_4SbF_6$ and $NF_4BF_4$, respectively, results in a relatively simple and economical process for the production of $NF_4BF_4$ in a purity of about 97 mol %. The purity of the product can be increased to better than 99 mol % by a single recrystallization from $BrF_5$.

Accordingly, it is an object of the present invention to provide an improved, economically feasible process for the production of $NF_4BF_4$.

Another object of the present invention is to provide an economically feasible metathetical process for the production of high purity $NF_4BF_4$.

Another object of the present invention is to provide an improved process for the production of the $NF_4SbF_6$ precursor.

DETAILED DESCRIPTION OF INVENTION

These and other objects and features of the present invention will be apparent from the following examples. It is understood, however, that these examples are merely illustrative of the invention and should not be considered as limiting the invention in any sense.

EXAMPLE I

Antimony pentafluoride (1.8 mol) was placed into a passivated 2l Monel cylinder and $NF_3$ (3.6 mol) and $F_2$ (3.6 mol) were added at −196° C. The cylinder was heated to 250° C for 72 hours. The unreacted $NF_3$ (1.8 mol) and $F_2$ (1.8 mol) were pumped off at room temperature leaving behind $NF_4SbF_6$ (1.8 mol). The $NF_4SbF_6$ product was characterized by elemental analysis, infrared, Raman and $^{19}F$ nmr spectroscopy, and its x-ray powder diffraction pattern, and did not contain any significant amounts of polyantimonate anions.

EXAMPLE II

Cesium tetrafluoroborate (2.15 mol) and $NF_4SbF_6$ (2.27 mol) were placed in a 2l Teflon reactor equipped with a filter top. Anhydrous HF (27.5 mol) was added and the mixture was agitated at 25° C for 1 hour. The reactor was cooled to −78° C, inverted and the $CsSbF_6$ precipitate was separated from the $NF_4BF_4$ solution by filtration. The filtrate was pumped to dryness, resulting in 310g of product which based on its elemental and spectroscopic analyses had the composition (in mol %): $NF_4BF_4$ 95.0; $NF_4SbF_6$ 4.6; $CsSbF_6$ 0.4. The purity of this crude product was increased to 97 or 99 + mol % by recrystallization at 25° C from anhydrous HF or $BrF_5$, respectively.

It should be understood that, in addition to its use as a precursor for $NF_4BF_4$, the $NF_4SbF_6$ may itself be used as a solid propellant gas generator or may be used as a fluorinating agent in other chemical processes.

Obviously, numerous variations and modifications may be made without departing from the processes of the present invention. Therefore, it should be clearly understood that the form of the present invention described above is illustrative only and is not intended to limit the scope of the present invention.

We claim:

1. Improved metathetical process for the production of $NF_4BF_4$, comprising the steps of combining $CsBF_4$ with a 0–15 mol % excess of $NF_4SbF_6$ in anhydrous HF at room temperature, cooling the mixture to −78° C and removing the $CsSbF_6$ precipitate by filtration at −78° C.

2. Process according to claim 1, wherein the excess of $NF_4SbF_6$ used is from 5 to 10 mol %.

3. Process according to claim 1, wherein the crude product is recrystallized at room temperature from anhydrous HF.

4. Process according to claim 1, wherein the crude product is recrystallized at room temperature from $BrF_5$.

5. The process of producing $NF_4BF_4$ comprising the steps of:
heating $SbF_5$ in the presence of an excess of $NF_3$ and $F_2$ to 250° C until conversion of $SbF_5$ to $NF_4SbF_6$ is complete,
combining $CsBF_4$ with a 0–15 mol % excess of $NF_4SbF_6$ in anhydrous HF, and
removing the $CsSbF_6$ precipitate by filtration at −78° C.

* * * * *